United States Patent
You et al.

(10) Patent No.: US 8,379,519 B2
(45) Date of Patent: Feb. 19, 2013

(54) METHOD FOR REALIZING RESOURCE ADMISSION CONTROL AT PUSH MODE IN NOMADISM SCENE OF NGN

(75) Inventors: Jianjie You, Shenzhen (CN); Jun Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 424 days.

(21) Appl. No.: 12/808,274

(22) PCT Filed: Dec. 20, 2007

(86) PCT No.: PCT/CN2007/003705
§ 371 (c)(1),
(2), (4) Date: Jun. 15, 2010

(87) PCT Pub. No.: WO2009/079843
PCT Pub. Date: Jul. 2, 2009

(65) Prior Publication Data
US 2010/0272053 A1 Oct. 28, 2010

(51) Int. Cl.
*H04L 12/28* (2006.01)
(52) U.S. Cl. .................. 370/232; 370/431; 370/464
(58) Field of Classification Search .......... 370/229–232, 370/235, 252, 253, 400, 431, 463–465
See application file for complete search history.

(56) References Cited

U.S. PATENT DOCUMENTS

2007/0053361 A1* 3/2007 Chen et al. .................... 370/392
2009/0116404 A1* 5/2009 Mahop et al. ................. 370/254

FOREIGN PATENT DOCUMENTS

| CN | 1832447 A | 9/2006 |
| CN | 1925420 A | 3/2007 |
| EP | 1806900 A1 | 7/2007 |

* cited by examiner

*Primary Examiner* — Kerri Rose
(74) *Attorney, Agent, or Firm* — McClure, Qualey & Rodack, LLP

(57) ABSTRACT

A method for implementing resource and admission control in PUSH mode in nomadism scenario of NGN comprises the following steps: after a subscriber accesses NGN in a visited network, initiates a service request to AF of a home network thereof, and receives a resource request transmitted by AF, SPDF of the home network transmitting the resource request to A-RACF of the visited network through SPDF of the visited network; A-RACF of the visited network making a resource policy decision on the resource request, and transmitting the decision result to RCEF of the visited network for policy installation; A-RACF of the visited network transmitting a resource request response to SPDF of the home network through SPDF of the visited network; in these steps, after receiving the resource request, SPDF of the home network and/or SPDF of the visited network perform authorization examining for the resource request.

17 Claims, 6 Drawing Sheets

METHOD FOR REALIZING RESOURCE ADMISSION CONTROL AT PUSH MODE IN NOMADISM SCENE OF NGN

TECHNICAL FIELD

The present invention relates to telecommunication field, and in particular, to a method for implementing resource and admission control in PUSH mode in nomadism scenario of a next generation network.

BACKGROUND OF THE INVENTION

NGN (Next Generation Network) is a hot research subject in the current communication field, and it adopts packet techniques such as IP (Internet Protocol) as the bearer network technology to converge fixed telecommunication network with mobile telecommunication network, and can provide more diverse multi-media services for subscribers.

The European standardization organization of TISPAN (Telecommunication and Internet Converged Services and Protocols for Advanced Networking) set up a special research group working on formulating NGN technology standards. TISPAN divides NGN architecture into a service layer and a transmission layer, and NASS (Network Attachment Subsystem) and RACS (Resource and Admission Control Subsystem) are incorporated into the transmission layer to be responsible for providing separate subscriber access management and resource control assurance functions for the upper service layer.

The functional architecture of TISPAN RACS is shown in FIG. 1. RACS associates the resource requirement of the service layer with the resource distribution of the bearer layer of the network, and mainly implements functions such as policy control, resource reservation, admission control, NAT (Network Address Translation) traversal and so on. RACS provides control service of the transmission layer for applications through a series of QoS (Quality of Service) policies so as to enable the subscriber terminal to obtain the required QoS assurance.

RACS is composed of two entities: SPDF (Service-based Policy Decision Function) and A-RACF (Access-Resource and Admission Control Function).

SPDF

SPDF provides uniform interfaces for the application layer, shields the underlying network topology structure and specific access types and provides service-based policy control. SPDF selects a local policy according to the request of Application Function (referred to as AF in short) and maps the request to an IP QoS parameter, which is transmitted to A-RACF and BGF (Border Gateway Function) for controlling corresponding resources.

A-RACF

A-RACF controls an access network, and has functions of admission control and network policy convergence. A-RACF receives a request from SPDF, and then achieves admission control based on the stored policy by accepting or refusing the request for transmitting resources. A-RACF obtains network attachment information and QoS profile information of the subscriber from NASS through e4 reference point (interface), thus determining available network resources according to network position information (e.g., the address of the physical node accessing the accessed subscriber), meanwhile referring to the QoS profile information of the subscriber when processing a resource distribution request.

A transmission layer also comprises two function entities: BGF (Border Gateway Function) and RCEF (Resource Control Enforcement Function).

BGF

BGF is a packet-to-packet gateway, and can be located between an access network and a core network (for implementing core border gateway function); it can also be located between two core networks (for implementing interconnection border gateway function). BGF implements NAT traversal, gate control, QoS label, bandwidth restriction, use measurement, and resource synchronization functions under the control of SPDF.

RCEF

RCEF carries out Layer 2/Layer 3 (L2/L3) media steam policy transmitted from A-RACF through Re reference point and implements functions including gate control, QoS label and bandwidth restriction.

RACS supports QoS resource control in two modes which are "PULL" and "PUSH" modes to adapt to different types of UEs (User Equipments).

The so called PUSH mode means that AF requests RACS for QoS resource authorization and resource reservation for a service initiated by UE; if the request can be satisfied, then RACS actively pushes a decision to a transmission entity (RCEF) to obtain corresponding transmission resources. This mode applies to all types of UEs.

The so called PULL mode means that AF requests RACS for QoS resource authorization and resource reservation for a service initiated by UE, and a transmission entity (RCEF) actively requests RACS for a decision when receiving a transmission layer QoS signaling message. This mode applies to a UE which has transmission layer QoS negotiation ability and which can explicitly request QoS resource reservation through a transmission layer signaling.

TISPAN NASS and RACS transmit messages via an e4 interface. NASS implements management for attachment of a subscriber to an access network, and its main functions comprises:

dynamically providing an IP address and other configuration parameters for a UE;

performing authentication on the access layer for the subscriber;

performing authorization of network access for the subscriber based on the subscriber service profile;

configuring an access network based on the subscriber service profile;

managing location information of the subscriber.

When the UE nomadizes, NGN can be divided into Home NGN and Visited NGN.

To sum up, RACS and NASS are critical components of the next generation network. RACS provides transmission resource control service for applications through a series of policies, associates the resource requirement of the service layer with the resource distribution of the network bearer layer, and mainly implements policy control, resource reservation, admission control, NAT traversal and so on. NASS implements management for attachment of a subscriber to an access network, and achieves IP address distribution, authentication and authorization of transmission layer, access network configuration, position information management and so on. NASS is responsible for controlling access authentication of a terminal in mobile or nomadism scenario.

Resource and admission control in nomadism scenario is quite different from that in non-nomadism scenario, and the subscriber data of the home network may be partially open or open to the visited network. Subscriber data of the home network being partially open to the visited network means:

the visited network can only obtain part of the subscriber data from the home network, in which case operations such as authentication of the subscriber can only be performed in the home network. Subscriber data of the home network being open to the visited network means that the visited network can obtain all the subscriber data from the home network, in which case operations such as authentication of the subscriber may be performed in the visited network.

Currently, there is no method in the prior art for realizing resource and admission control in PUSH mode at control layers (i.e., layers involving RACS and NASS) in nomadism scenario in NGN.

SUMMARY OF THE INVENTION

The technical problem to be solved by the present invention is to overcome the drawbacks of the prior art by providing a method for implementing resource and admission control in PUSH mode at control layers (i.e., layers involving RACS and NASS) in nomadism scenario in NGN.

In order to solve the above technical problem, the present invention provides a method for implementing resource and admission control in PUSH mode in nomadism scenario of a next generation network, after a subscriber accesses NGN in a visited network and initiates a service request to AF of its home network, the method comprising the following steps of:

A: after receiving a resource request transmitted by the AF corresponding to the service request, SPDF of the home network transmitting the resource request to A-RACF of the visited network through SPDF of the visited network;

B: the A-RACF of the visited network making a resource policy decision on the resource request, and transmitting a decision result to RCEF of the visited network for policy installation;

C: the A-RACF of the visited network transmitting a resource request response to the SPDF of the home network through the SPDF of the visited network.

wherein in the above steps, after receiving the resource request, the SPDF of the home network and/or the SPDF of the visited network perform authorization examining for the resource request.

Additionally, if the service corresponding to the service request needs to visit a core network of the home network, then in the step C, the SPDF of the visited network transmits a request message to BGF of the home network after receiving the resource request response, the request message contains policy information for controlling the BGF; the BGF performs processing according to the policy information and sends a response to the SPDF of the home network.

Additionally, if the service corresponding to the service request needs to visit the core network of the home network and the visited network and the home network are of equivalent operator architecture, then in the step C, the SPDF of the visited network transmits a request message to BGF of the visited network after receiving the resource request response, the request message contains policy information for controlling the BGF; the BGF performs processing according to the policy information and sends a response to the SPDF of the visited network.

Additionally, the method also comprises the following steps before the step A:

a1: the SPDF of the home network transmitting a subscriber information inquiry message to A-RACF of the home network after receiving the resource request;

a2: the A-RACF of the home network transmitting the subscriber information inquiry message to NASS of the home network; NASS of the home network including the subscriber service profile of the subscriber into a corresponding subscriber information inquiry response message, and transmitting the subscriber information inquiry response message to the SPDF of the home network through the A-RACF of the home network;

a3: the SPDF of the home network examining the resource request according to the subscriber service profile and the service bandwidth utilization information of the subscriber stored locally, and determining whether the resource request is valid; if valid, then executing the step A.

Additionally, in the step C, the A-RACF of the visited network contains the service bandwidth utilization information of the resource request into the resource request response; after receiving the resource request response, the SPDF of the home network records the service bandwidth utilization information.

Additionally, in the step a3, the following rules are adopted to determine whether the resource request is valid:

If the total of a bandwidth requested by a service corresponding to the resource request and a bandwidth that has been used by a corresponding service of the subscriber exceeds a corresponding service subscription bandwidth of the subscriber recorded in the subscriber service profile, then the resource request is invalid;

If the total of the bandwidth requested by the resource request and the bandwidth that has been used by the subscriber exceeds the total subscription bandwidth of the subscriber recorded in the subscriber service profile, then the resource request is invalid;

Otherwise, the resource request is valid.

Additionally, the method further comprises the following steps between the step A and the step B:

b1: the A-RACF of the visited network transmitting a subscriber information inquiry message to NASS of the visited network;

b2: the NASS of the visited network transmitting the subscriber information inquiry message to NASS of the home network; the NASS of the home network containing the subscriber service profile of the subscriber into a corresponding subscriber information inquiry response message which is sent to the A-RACF of the visited network through the NASS of the visited network;

b3: the A-RACF of the visited network examining the resource request according to the subscriber service profile and the service bandwidth utilization information of the subscriber stored locally, and determining whether the resource request is valid; if valid, then executing the step B.

Additionally, in the step B, after making the resource policy decision, the A-RACF of the visited network records the service bandwidth utilization information of the subscriber.

Additionally, in the step b3, the following rules are adopted to determine whether the resource request is valid:

If a total of a bandwidth requested by a service corresponding to the resource request and a bandwidth that has been used by a corresponding service of the subscriber exceeds a corresponding service subscription bandwidth of the subscriber recorded in the subscriber service profile, then the resource request is invalid;

If a total of the bandwidth requested by the resource request and the bandwidth that has been used by the subscriber exceeds a total subscription bandwidth of the subscriber recorded in the subscriber service profile, then the resource request is invalid;

Otherwise, the resource request is valid.

Additionally, the SPDF of the home network performs the authorization examining for the resource request by determining whether the received resource request matches with the local policy of the home network;

the SPDF of the visited network performs the authorization examining for the resource request by determining whether the received resource request matches with the local policy of the visited network.

Additionally, the method further comprises the following step after the step C: the SPDF of the visited network transmitting a response to the AF to respond the resource request; after receiving the response, the AF making a response to respond the service request.

The method of the present invention can achieve resource admission control in PUSH mode in different nomadism scenarios and in various cases with different degree of openness of the subscriber data of the home network to the visited network, thus improving the existing NGN system and providing assurance for a subscriber to use services of NGN in a visited network.

PREFERRED EMBODIMENTS OF THE INVENTION

The present invention will be described in detail with reference to the drawings and the examples.

Figure 1:
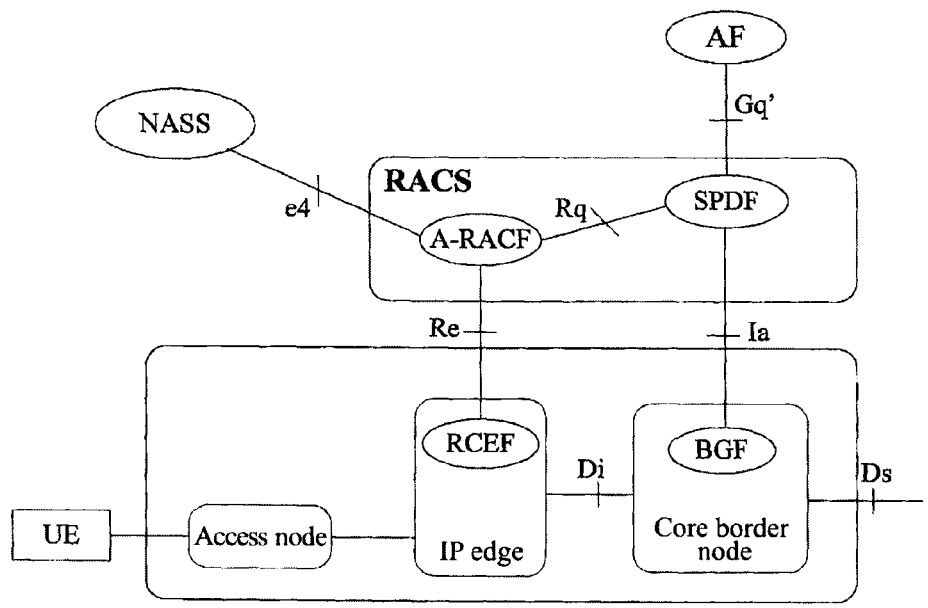
FIG. 1 shows the functional architecture of RACS of TISPAN.
Figure 2:
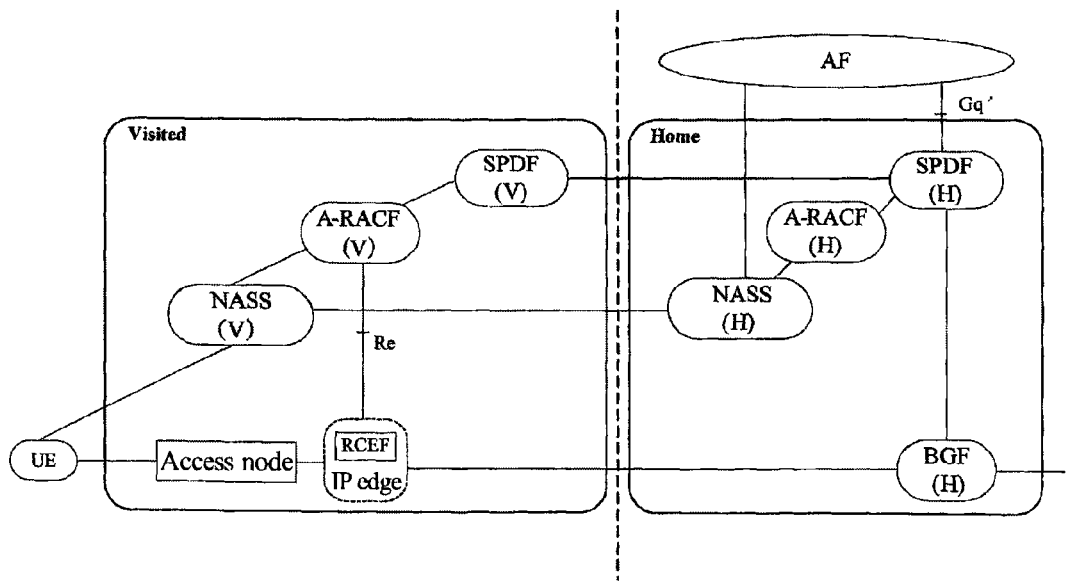
FIG. 2 illustrates the Wholesale nomadism scenario of RACS and NASS.
Figure 3:
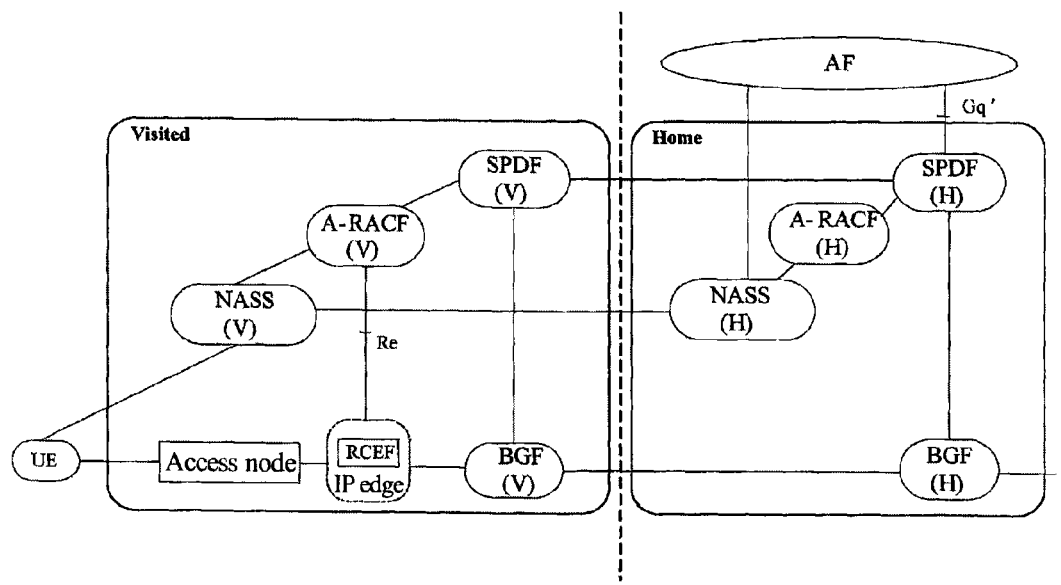
FIG. 3 illustrates the equivalent operator nomadism scenario of RACS and NASS.

FIG. 2 and FIG. 3 are two typical scenarios for subscriber nomadism, which are Wholesale nomadism scenario and equivalent operator nomadism scenario, wherein the service control subsystem (AF) for providing services for a subscriber is located in a home network, and subscriber data are stored in a visited network.

In the Wholesale nomadism scenario, one party is a network operator, who opens a network layer as fundamental facilities to a plurality of service providers in a wholesale manner and does not provide services; the other party is service provider, who provides various services. When a subscriber is in this scenario, the subscriber accesses and visits a network using the network of the network operator and enjoys services provided by the service provider.

In the equivalent operator nomadism scenario, both of the two parties have their own network access and service. When a subscriber is in this kind of scenario, the subscriber accesses and visits a network using the network of the visited operator and enjoys services provided by the home network.

The difference between Wholesale nomadism scenario and equivalent operator nomadism scenario (can also be called as Wholesale NGN architecture and equivalent operator NGN architecture) is that in equivalent operator nomadism scenario, the related service of the home network can only be visited via BGF of the visited network; i.e., in this case, BGF of the visited network is indispensable; while in Wholesale nomadism scenario, BGF of the visited network is not necessary.

In addition to taking the above different nomadism scenarios into consideration, the method for implementing resource and admission control in PUSH mode in nomadism scenario in NGN also needs to perform processing differently according to two cases of partial openness and openness of the subscriber data of the home network to the visited network.

In the text hereafter, NASS of the visited network is indicated with NASS(V), and NASS of the home network is indicated with NASS(H); A-RACF of the visited network is indicated with A-RACF(V), and A-RACF of the home network is indicated with A-RACF(H); SPDF of the visited network is indicated with SPDF(V), and SPDF of the home network is indicated with SPDF(H); BGF of the visited network is indicated with BGF(V), and BGF of the home network is indicated with BGF(H).

Example 1

Figure 4:
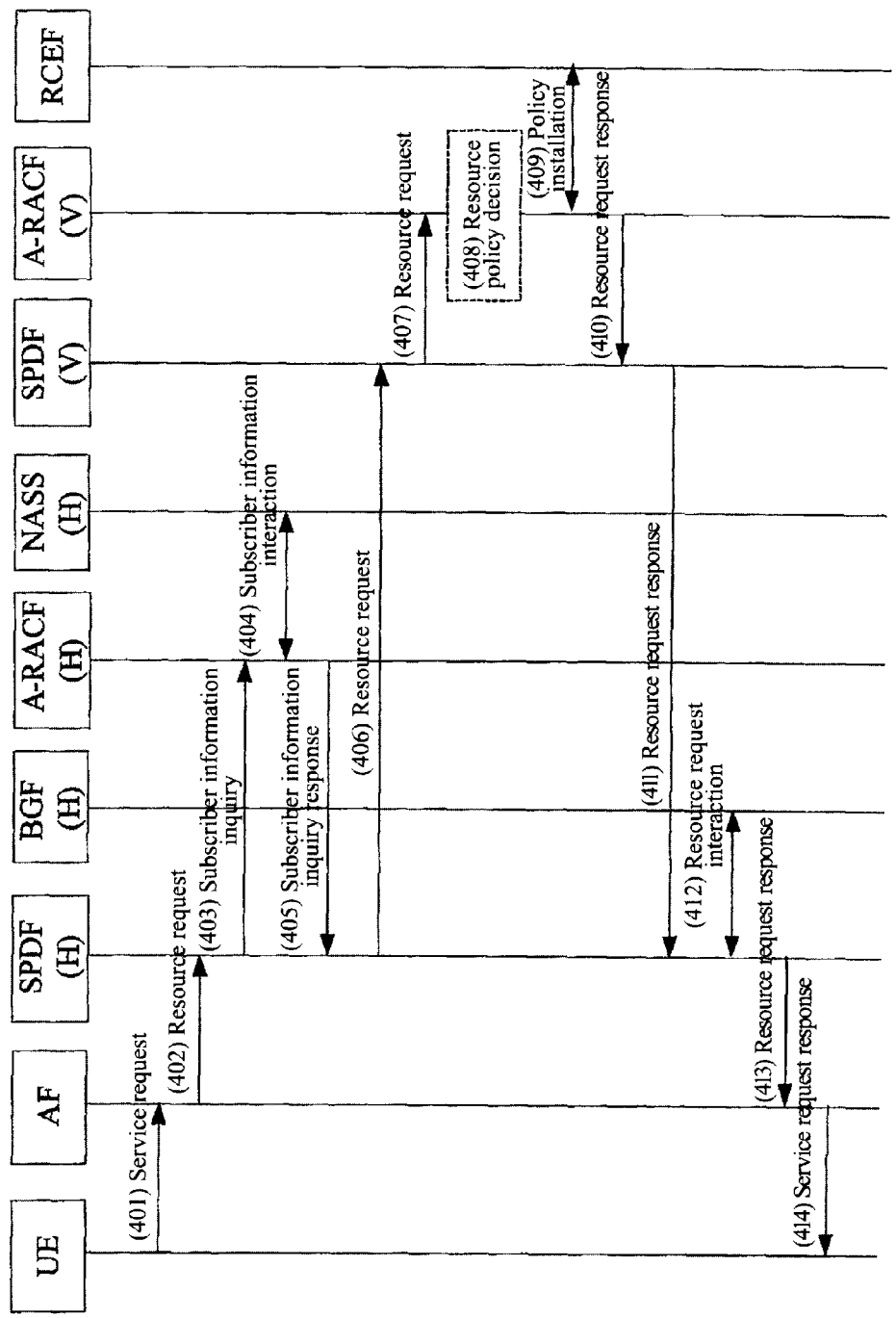
FIG. 4 is a flow of Wholesale nomadism resource and admission control when the subscriber data of the home network are partially open to the visited network.

FIG. 4 is a flow of Wholesale nomadism resource and admission control when the subscriber data of the home network are partially open to the visited network.

Since it is in a Wholesale nomadism scenario, resource and admission control does not need to use BGF of the visited network, and does not need to be controlled by RACS.

As shown in FIG. 4, the method comprises the following steps:

401, UE initiating a service request, and transmitting a corresponding service request message to AF; AF creating a session according to the request, wherein the ID (identifier) of the session should be contained in the subsequent messages;

402, after receiving the service request message, AF transmitting a resource request message to SPDF(H);

403, SPDF(H) performing authorization examining for the resource request message and transmitting a subscriber information inquiry message to A-RACF(H) to inquire the subscription information of the subscriber.

The above authorization examining comprises determining whether the request matches with the local policy of the home network: if yes, SPDF(H) transmits the subscriber information inquiry message to A-RACF(H); otherwise, SPDF(H) refuses the resource request, and this method ends.

404, after receiving the subscriber information inquiry message, A-RACF(H) transmitting the message to NASS(H); NASS(H) including the subscriber service profile of the subscriber into a subscriber information inquiry response message, and transmitting the subscriber information inquiry response message to A-RACF(H).

405, A-RACF(H) transmitting the above subscriber information inquiry response message to SPDF(H); SPDF(H) detecting the resource request according to the subscriber service profile included in the message and the service bandwidth utilization information of the subscriber stored locally, and determining whether the resource request is valid:

if the total of the bandwidth requested by the service corresponding to the resource request and the bandwidth that has been used by a corresponding service of the subscriber exceeds the corresponding service subscription bandwidth of the subscriber recorded in the subscriber service profile, then the resource request is invalid;

if the total of the bandwidth requested by the resource request and the bandwidth that has been used by the subscriber exceeds the total subscription bandwidth of the subscriber recorded in the subscriber service profile, then the resource request is invalid;

otherwise, the resource request is valid.

406, if the result of the above examining for resource request is that the resource request is valid, then SPDF(H) transmitting the resource request message to SPDF(V); otherwise, SPDF(H) refusing the resource request, and this method ending.

407, after receiving the resource request message, SPDF (V) performing authorization examining for the resource request;

the above authorization examining comprises determining whether the request matches with the local policy of the visited network: if yes, SPDF(V) transmits the resource request message to A-RACF(V); otherwise, SPDF(V) refuses the resource request, and this method ends.

408, after receiving the resource request message, A-RACF(V) making a resource policy decision, and recording the service bandwidth utilization information of the subscriber this time (i.e., bandwidth distributed for the resource request/service request).

409, A-RACF(V) interacting with RCEF of the visited network, RCEF performing policy installation according to the result of the above resource policy decision and making a response to A-RACF(V).

410, A-RACF(V) transmitting a resource request response message to SPDF(V);

the resource request response message includes the service bandwidth utilization information of the subscriber this time.

411, SPDF(V) transmitting the above resource request response message to SPDF(H).

412, SPDF(H) transmitting a request message to BGF(H) if the service request needs to use BGF(H), i.e., if the service needs to visit the core network of the home network, wherein the request message contains policy information for controlling BGF(H); after performing corresponding processing according to the above policy information, BGF(H) returning a corresponding response message to SPDF(H).

413, after receiving the above resource request response message, SPDF(H) recording/updating the service bandwidth utilization information of the subscriber and transmitting the resource request response message to AF.

414, AF transmitting a service request response message to UE.

It should be noted that in the above steps 403 and 407, SPDF(H) and SPDF(V) perform authorization examining for the received resource request message, and determine whether the request matches with the local policy. In fact, if the home network and the visited network have negotiated in advance, only one of SPDF(H) and SPDF(V) is required to perform the above authorization examining Example 2

Figure 5:
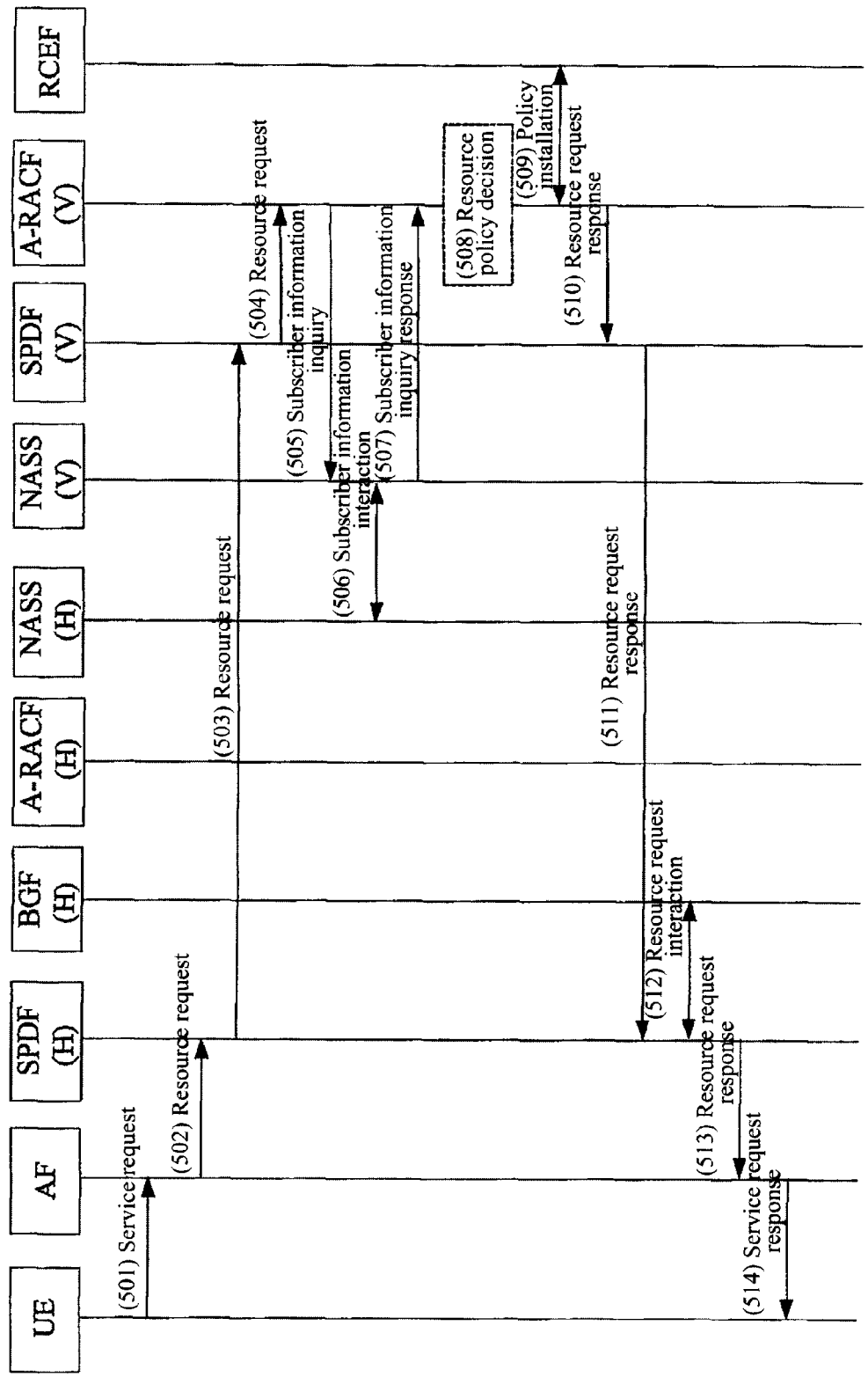
FIG. 5 is a flow of Wholesale nomadism resource and admission control when the subscriber data of the home network are open to the visited network.

FIG. 5 is a flow of Wholesale nomadism resource and admission control when the subscriber data of the home network are open to the visited network.

Since it is in a Wholesale nomadism scenario, resource and admission control does not need to use BGF of the visited network, and does not need to be controlled by RACS.

As shown in FIG. 5, the method comprises the following steps:

501~502, the same with steps 401~402 respectively.

503, SPDF(H) performing authorization examining for the resource request of the subscriber and transmitting a resource request message to SPDF(V);

Similarly, the above authorization examining comprises determining whether the request matches with the local policy of the home network.

504, after receiving the resource request message, SPDF (V) performing authorization examining for the request and transmitting the resource request message to A-RACF (V);

Similarly, the above authorization examining comprises determining whether the request matches with the local policy of the visited network.

505, after receiving the resource request message, A-RACF(V) transmitting a subscriber information inquiry message to NASS(V) to inquire the subscription information of the subscriber.

506, after receiving the subscriber information inquiry message, NASS(V) transmitting the message to NASS(H); NASS(H) including the subscriber service profile of the subscriber into a subscriber information inquiry response message, and transmitting the subscriber information inquiry response message to NASS(V).

507, NASS(V) transmitting the above subscriber information inquiry response message to A-RACF(V); A-RACF(V) detecting the resource request according to the subscriber service profile included in the message and the service bandwidth utilization information of the subscriber stored locally, and determining whether the resource request is valid:

if the total of the bandwidth requested by the service corresponding to the resource request and the bandwidth that has been used by a corresponding service of the subscriber exceeds the corresponding service subscription bandwidth of the subscriber recorded in the subscriber service profile, then the resource request is invalid;

if the total of the bandwidth requested by the resource request and the bandwidth that has been used by the subscriber exceeds the total subscription bandwidth of the subscriber recorded in the subscriber service profile, then the resource request is invalid;

otherwise, the resource request is valid.

508, if the result of the above examining for resource request is that the resource request is valid, A-RACF(V) making a resource policy decision, and recording the service bandwidth utilization information of the subscriber this time;

509, A-RACF(V) interacting with RCEF of the visited network, RCEF performing policy installation according to the result of the above resource policy decision and making a corresponding response to A-RACF(V).

510, A-RACF(V) transmitting a resource request response message to SPDF(V);

the resource request response message may include the service bandwidth utilization information of the subscriber this time.

511, SPDF(V) transmitting the above resource request response message to SPDF(H).

512, SPDF(H) transmitting a request message to BGF(H) if the service request is required to use BGF(H), i.e., if the service is required to visit the core network of the home network, wherein the request message contains policy information for controlling BGF(H); after performing corresponding processing according to the above policy information, BGF(H) returning a corresponding response message to SPDF(H).

513, after receiving the above resource request response message, SPDF(H) recording/updating the service bandwidth utilization information of the subscriber and transmitting the resource request response message to AF.

514, AF transmitting a service request response message to UE.

Example 3

Figure 6:
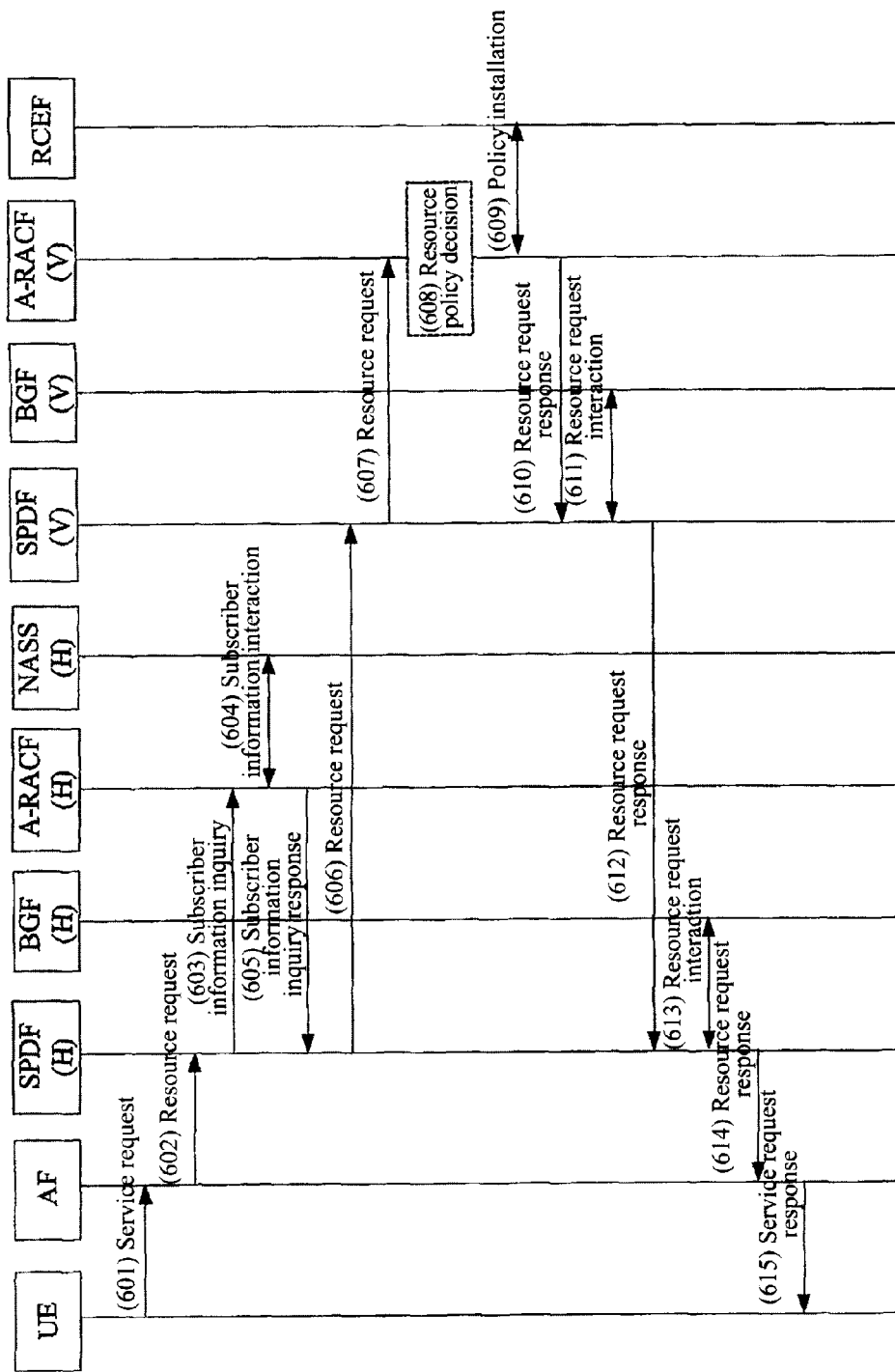
FIG. 6 is a flow of equivalent operator nomadism resource and admission control when the subscriber data of the home network are partially open to the visited network.

FIG. 6 is a flow of equivalent operator nomadism resource and admission control when the subscriber data of the home network are partially open to the visited network;

Since it is in an equivalent operator nomadism scenario, resource and admission control may be required to use BGF of the visited network, and may also be required to be controlled by RACS of the visited network.

As shown in FIG. 6, the method comprises the following steps:

601~610, the same with steps 401~410 respectively.

611, SPDF(V) transmitting a request message to BGF(V) if the service request is required to use BGF(V), i.e., if the service is required to visit the core network of the home network, wherein the request message contains policy information for controlling BGF(V); after performing corresponding processing according to the above policy information, BGF(V) returning a corresponding response message to SPDF(V);

In an equivalent operator architecture, when the service needs to visit the core network of the home network, it has to access the core network of the home network via the core network of the visited network, therefore, it needs to use BGF(V) and needs to be controlled.

612, SPDF(V) transmitting the above resource request response message to SPDF(H).

613, SPDF(H) transmitting a request message to BGF(H) if the service request needs to use BGF(H), i.e., if the service needs to visit the core network of the home network, wherein the request message contains policy information for controlling BGF(H); after performing corresponding processing according to the above policy information, BGF(H) returning a corresponding response message to SPDF(H).

614, after receiving the above resource request response message, SPDF(H) recording/updating the service bandwidth utilization information of the subscriber and transmitting the resource request response message to AF.

615, AF transmitting a service request response message to UE.

Example 4

Figure 7:
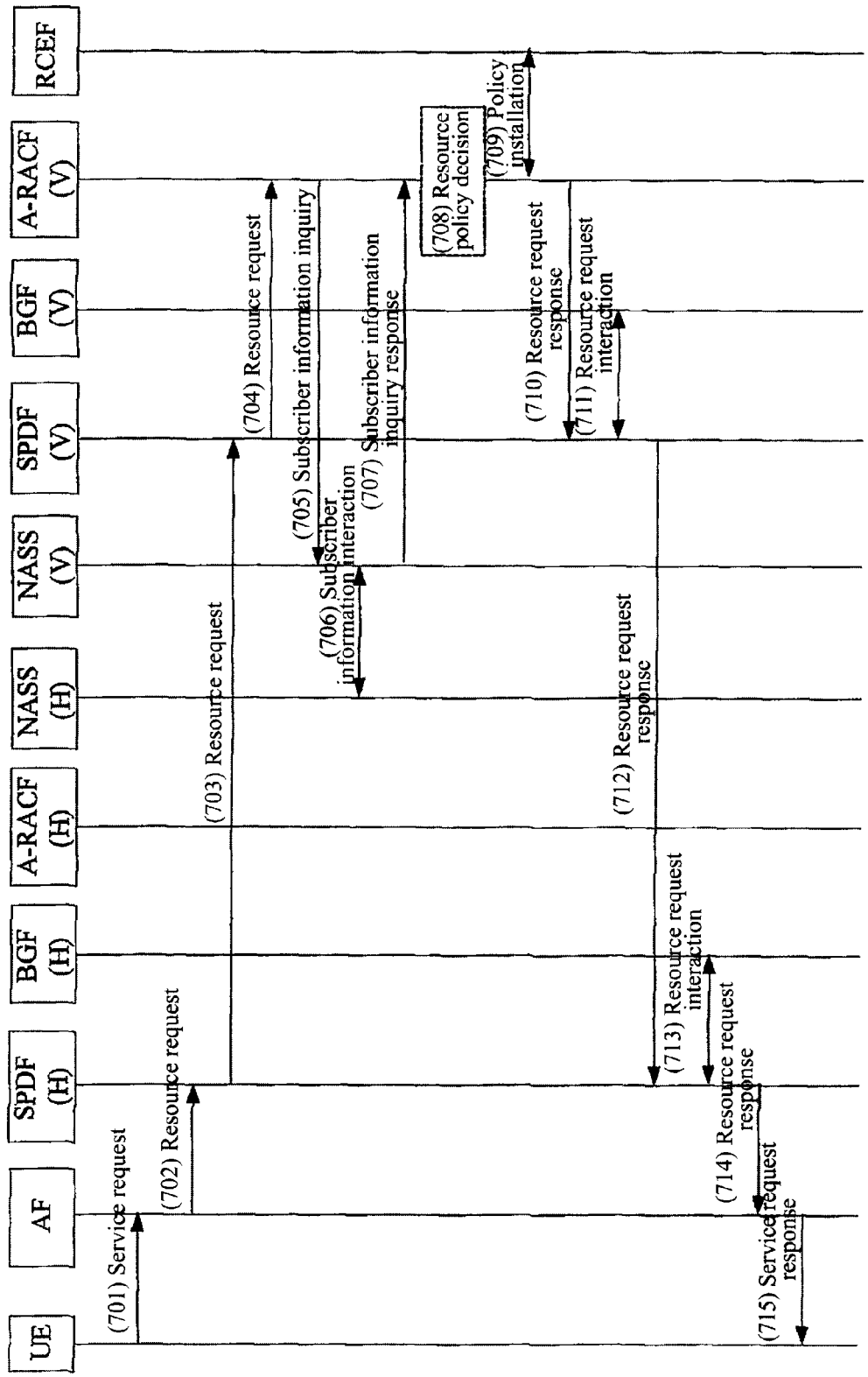
FIG. 7 is a flow of equivalent operator nomadism resource and admission control when the subscriber data of the home network are open to the visited network.

FIG. 7 is a flow of equivalent operator nomadism resource and admission control when the subscriber data of the home network are open to the visited network.

Since it is in an equivalent operator nomadism scenario, resource and admission control may need to use BGF of the visited network, and may also need to be controlled by RACS of the visited network.

As shown in FIG. 7, the method comprises the following steps:

701~710, the same with steps 501~510 respectively.

711, SPDF(V) transmitting a request message to BGF(V) if the service request needs to use BGF(V), i.e., if the service needs to visit the core network of the home network, wherein the request message contains policy information for controlling BGF(V); after performing corresponding processing according to the above policy information, BGF(V) returning a corresponding response message to SPDF(V);

In an equivalent operator architecture, when the service needs to visit the core network of the home network, it has to access the core network of the home network via the core network of the visited network, therefore, it needs to use BGF(V) and needs to be controlled.

712, SPDF(V) transmitting the above resource request response message to SPDF(H).

713, SPDF(H) transmitting a request message to BGF(H) if the service request needs to use BGF(H), i.e., if the service needs to visit the core network of the home network, wherein the request message contains policy information for controlling BGF(H); after performing corresponding processing according to the above policy information, BGF(H) returning a corresponding response message to SPDF(H).

714, after receiving the above resource request response message, SPDF(H) recording/updating the service bandwidth utilization information of the subscriber and transmitting the resource request response message to AF.

715, AF transmitting a service request response message to UE.

Based on the principle of the present invention, the above examples may have many variations, for example:

When the subscriber data of the home network are open to the visited network, resource and admission control in PUSH mode may also be implemented according to the flow in the case that the subscriber data of the home network are partially open to the visited network. In other words, SPDF(H) interacts with NASS(H) in the home network to inquire the subscription information of the subscriber to obtain the subscriber service profile, and performs corresponding examining for resource request.

INDUSTRIAL APPLICABILITY

The method of the present invention can implement resource and admission control in PUSH mode in different nomadism scenarios and in various cases with different degree of openness of the subscriber data of the home network to the visited network, thus improving the existing NGN system and providing assurance for a subscriber to use services of NGN in a visited network.

What we claim is:

1. A method for implementing resource and admission control of a next generation network, comprising: in nomadism scenario, after a subscriber accesses a next generation network in a visited network and initiates a service request to Application Function (AF) of the subscriber's home network, A: after receiving a resource request transmitted by the AF corresponding to the service request, Service-based Policy Decision Function (SPDF) of the home network transmitting the resource request to Access-Resource and Admission Control Function (A-RACF) of the visited network through SPDF of the visited network;

B: the A-RACF of the visited network making a resource policy decision on the resource request, and transmitting in push mode a decision result to Resource Control Enforcement Function (RCEF) of the visited network for policy installation;

C: the A-RACF of the visited network transmitting a resource request response to the SPDF of the home network through the SPDF of the visited network;

wherein in the above steps, after receiving the resource request, the SPDF of the home network and/or the SPDF of the visited network perform authorization examining for the resource request before the resource request is transmitted to the A-RACF of the visited network.

2. A method according to claim 1, wherein if a service corresponding to the service request needs to visit a core network of the home network, then in the step C, the SPDF of the visited network transmits a request message to Border Gateway Function (BGF) of the home network after receiving the resource request response, wherein the request message contains policy information for controlling the BGF; the BGF performs processing according to the policy information and sends a response to the SPDF of the home network.

3. A method according to claim 2, wherein if the service corresponding to the service request needs to visit the core network of the home network and the visited network and the home network are of equivalent operator architecture, then in the step C, the SPDF of the visited network transmits a request message to BGF of the visited network after receiving the resource request response, wherein the request message contains policy information for controlling the BGF; the BGF performs processing according to the policy information and sends a response to the SPDF of the visited network.

4. A method according to claim 2, the method further comprising the following steps before the step A:
   a1: the SPDF of the home network transmitting a subscriber information inquiry message to A-RACF of the home network after receiving the resource request;
   a2: the A-RACF of the home network transmitting the subscriber information inquiry message to a Network Attachment Subsystem (NASS) of the home network; the NASS of the home network including subscriber service profile of the subscriber into a corresponding subscriber information inquiry response message, and transmitting the subscriber information inquiry response message to the SPDF of the home network through the A-RACF of the home network;
   a3: the SPDF of the home network examining the resource request according to the subscriber service profile and service bandwidth utilization information of the subscriber stored locally, and determining whether the resource request is valid; if valid, then executing the step A.

5. A method according to claim 4, wherein in the step C, the A-RACF of the visited network contains the service bandwidth utilization information of the resource request into the resource request response; after receiving the resource request response, the SPDF of the home network records the service bandwidth utilization information.

6. A method according to claim 4, wherein in the step a3, the following rules are adopted to determine whether the resource request is valid:
   if a total of a bandwidth requested by a service corresponding to the resource request and a bandwidth that has been used by a corresponding service of the subscriber exceeds a corresponding service subscription bandwidth of the subscriber recorded in the subscriber service profile, then the resource request is invalid;
   if a total of the bandwidth requested by the resource request and the bandwidth that has been used by the subscriber exceeds a total subscription bandwidth of the subscriber recorded in the subscriber service profile, then the resource request is invalid;
   otherwise, the resource request is valid.

7. A method according to claim 2, the method further comprising the following steps between the step A and the step B:
   b1: the A-RACF of the visited network transmitting a subscriber information inquiry message to a Network Attachment Subsystem (NASS) of the visited network;
   b2: the NASS of the visited network transmitting the subscriber information inquiry message to a NASS of the home network; the NASS of the home network containing the subscriber service profile of the subscriber into a corresponding subscriber information inquiry response message, and transmitting the subscriber information inquiry response message to the A-RACF of the visited network through the NASS of the visited network;
   b3: the A-RACF of the visited network examining the resource request according to the subscriber service profile and the service bandwidth utilization information of the subscriber stored locally, and determining whether the resource request is valid; if valid, then executing the step B.

8. A method according to claim 7, wherein in the step B, after making the resource policy decision, the A-RACF of the visited network records the service bandwidth utilization information of the subscriber.

9. A method according to claim 7, wherein in the step b3, the following rules are adopted to determine whether the resource request is valid:
   if a total of a bandwidth requested by the service corresponding to the resource request and a bandwidth that has been used by a corresponding service of the subscriber exceeds a corresponding service subscription bandwidth of the subscriber recorded in the subscriber service profile, then the resource request is invalid;
   if a total of the bandwidth requested by the resource request and the bandwidth that has been used by the subscriber exceeds a total subscription bandwidth of the subscriber recorded in the subscriber service profile, then the resource request is invalid;
   otherwise, the resource request is valid.

10. A method according to claim 1, wherein,
    the SPDF of the home network performs the authorization examining for the resource request by determining whether the received resource request matches with the local policy of the home network;
    the SPDF of the visited network performs the authorization examining for the resource request by determining whether the received resource request matches with the local policy of the visited network.

11. A method according to claim 1, wherein the method further comprises the following step after the step C: the SPDF of the visited network transmitting a response to the AF to respond the resource request; after receiving the response, the AF making a response to respond the service request.

12. A method according to claim 3, the method further comprising the following steps before the step A:
    a1: the SPDF of the home network transmitting a subscriber information inquiry message to A-RACF of the home network after receiving the resource request;
    a2: the A-RACF of the home network transmitting the subscriber information inquiry message to a Network Attachment Subsystem (NASS) of the home network; the NASS of the home network including subscriber service profile of the subscriber into a corresponding subscriber information inquiry response message, and transmitting the subscriber information inquiry response message to the SPDF of the home network through the A-RACF of the home network;
    a3: the SPDF of the home network examining the resource request according to the subscriber service profile and service bandwidth utilization information of the subscriber stored locally, and determining whether the resource request is valid; if valid, then executing the step A.

13. A method according to claim 12, wherein in the step C, the A-RACF of the visited network contains the service bandwidth utilization information of the resource request into the resource request response; after receiving the resource request response, the SPDF of the home network records the service bandwidth utilization information.

14. A method according to claim 12, wherein in the step a3, the following rules are adopted to determine whether the resource request is valid:

if a total of a bandwidth requested by a service corresponding to the resource request and a bandwidth that has been used by a corresponding service of the subscriber exceeds a corresponding service subscription bandwidth of the subscriber recorded in the subscriber service profile, then the resource request is invalid;

if a total of the bandwidth requested by the resource request and the bandwidth that has been used by the subscriber exceeds a total subscription bandwidth of the subscriber recorded in the subscriber service profile, then the resource request is invalid;

otherwise, the resource request is valid.

15. A method according to claim 3, the method further comprising the following steps between the step A and the step B:

b1: the A-RACF of the visited network transmitting a subscriber information inquiry message to a Network Attachment Subsystem (NASS) of the visited network;

b2: the NASS of the visited network transmitting the subscriber information inquiry message to a NASS of the home network; the NASS of the home network containing the subscriber service profile of the subscriber into a corresponding subscriber information inquiry response message, and transmitting the subscriber information inquiry response message to the A-RACF of the visited network through the NASS of the visited network;

b3: the A-RACF of the visited network examining the resource request according to the subscriber service profile and the service bandwidth utilization information of the subscriber stored locally, and determining whether the resource request is valid; if valid, then executing the step B.

16. A method according to claim 15, wherein in the step B, after making the resource policy decision, the A-RACF of the visited network records the service bandwidth utilization information of the subscriber.

17. A method according to claim 15, wherein in the step b3, the following rules are adopted to determine whether the resource request is valid:

if a total of a bandwidth requested by the service corresponding to the resource request and a bandwidth that has been used by a corresponding service of the subscriber exceeds a corresponding service subscription bandwidth of the subscriber recorded in the subscriber service profile, then the resource request is invalid;

if a total of the bandwidth requested by the resource request and the bandwidth that has been used by the subscriber exceeds a total subscription bandwidth of the subscriber recorded in the subscriber service profile, then the resource request is invalid;

otherwise, the resource request is valid.

\* \* \* \* \*